United States Patent [19]
Fujikawa et al.

[11] 3,848,574
[45] Nov. 19, 1974

[54] COMBUSTION PROMOTING IMPROVEMENT IN ROTARY ENGINE

[75] Inventors: Tetsuzo Fujikawa; Masahisa Kawano; Masaru Yamamoto, all of Akashi, Japan

[73] Assignee: Kawasaki Jyukogyo Kabushiki Kaisha, Hyogo-ken, Japan

[22] Filed: May 31, 1973

[21] Appl. No.: 365,739

[30] Foreign Application Priority Data
June 3, 1972 Japan.............................. 47-65655

[52] U.S. Cl. ............................................. 123/8.09
[51] Int. Cl............................................ F02b 53/12
[58] Field of Search................. 123/8.01, 8.09, 8.45

[56] References Cited
UNITED STATES PATENTS
3,777,720  12/1973  Williams........................... 123/8.09
FOREIGN PATENTS OR APPLICATIONS
1,526,387  3/1970  Germany.......................... 123/8.09

*Primary Examiner*—Carlton R. Croyle
*Assistant Examiner*—Michael Koczo, Jr.
*Attorney, Agent, or Firm*—Waters, Roditi, Schwartz & Nissen

[57] ABSTRACT

The sparking electrodes of a spark plug of a rotary engine are disposed within a recess formed in the wall of the engine casing with an opening into the casing interior at a position downstream from the minor axis of the trochoidal inner surface of the casing inner surface, this recess being defined by a substantially semi-cylindrical downstream wall surface, side wall surfaces convergently extending in the upstream direction from the downstream wall, and an inclined bottom surface adjoining the side wall and downstream wall surfaces and extending smoothly with progressively decreasing depth toward the upstream direction. "Upstream" and "downstream" directional designations are with respect to the rotational direction of the engine rotor.

2 Claims, 3 Drawing Figures

3,848,574

COMBUSTION PROMOTING IMPROVEMENT IN ROTARY ENGINE

BACKGROUND OF THE INVENTION

This invention relates generally to rotary internal combustion engines or rotary engines of the type in which a multi-lobed rotor undergoes a planetary rotational movement within a casing including a center housing having a trochoidal inner surface and side housings disposed on opposite sides the center housing, thereby to effect the four strokes of intake, compression, explosion, and exhaust of the working fluid. More particularly, the invention relates to a structural innovation for improving combustion in the combustion chamber of the engine.

In general, in a rotary engine of the type referred to above having a torchoidal inner surface, the shape of the combustion chamber changes abruptly as the rotor rotates. For this reason, while the flame of combustion propagates at high velocity on the side downstream from the spark plug (the side in the rotational direction), there is almost no propagation or very slow propagation of the flame on the side upstream of the spark plug. As a consequence, uncombusted gases such as hydrocarbons and carbon monoxide readily remain in the cranny or nook on the upstream side of the combustion chamber during the combustion and exhaust strokes, thus giving rise to a drop in power output, air pollution, and other deleterious results.

Accordingly, a number of measures aimed at overcoming these difficulties have heretofore been proposed, among which is the positioning of the spark plug on the upstream side (reverse rotation side) of the trochoid minor axis as disclosed in the specification of Japanese Utility Model Publication No. 27123/1971 and the communication of tye combustion and expansion chamber with the intake and compression chamber by means of a slot thereby to release the uncombusted gases as disclosed in the specification of Japanese Utility Model Publication No. 14805/1967.

When output performance is considered, however, these measures all have disadvantageous features such as difficulty of selecting the optimum ignition timing, substantial drop in the compression ratio, and instability at low speeds. In addition, a structural arrangement wherein a spark plug is provided on each of the upstream and downstream sides of the minor axis of the trochoid has also been known heretofore. This known arrangement, however, unavoidably entails an increase in production and maintenance costs.

SUMMARY OF THE INVENTION

It is an object of this invention to overcome the above described difficulties encountered in the prior art by providing an improvement in the structure of the combustion chamber in a rotary engine whereby the flame from a single spark plug is directed compulsorily toward the upstream side where there is a high content of unburned substances. Specific objects are promotion of combustion, increase in power output, low fuel consumption, maintenance of stability of low speeds, and reduction of pollutants in the exhaust gases.

A further object of the invention is to provide the above stated improvement through a simple and inexpensive construction.

According to this invention, briefly summarized, there is provided, in a rotary engine of the type referred to above, an improvement which comprises the provision of a recess formed in the wall of the center housing with an opening into the interior of the casing and defined by a downstream wall surface surrounding the downstream side of the sparking electrodes of a spark plug, side wall surfaces contiguously adjoining the downstream wall surface on respectively opposite sides thereof and extending upstream, and a bottom surface contiguously adjoining the side wall and downstream wall surfaces and extending smoothly upstream with an inclination whereby the depth of the recess decreases progressively in the upstream direction to zero, the directions "upstream" and "downstream" being designations with respect to the rotor rotational direction.

The nature, principle, and utility of the invention will be more clearly apparent from the following detailed description with respect to a preferred embodiment of the invention when read in conjunction with the accompanying drawing, in which like parts are designated by like reference numerals, and which is briefly described below.

DETAILED DESCRIPTION

Figure 1:
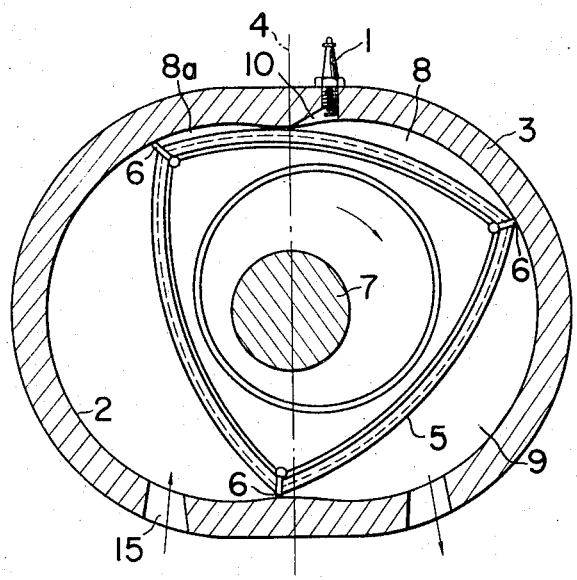
FIG. 1 is a cross section of a rotary engine in which the improvement of this invention is applied.

Referring to FIG. 1, the rotary engine shown therein has a center housing 3 with an inner surface 2 of the shape of a trochoid with a minor axis 4 and a rotor 5 of substantially triangular shape made up of internal envelope curves of the trochoid 2 and adapted to rotate about its own axis as it revolves about a shaft 7 and as all of its apexes (apex seals 6) continually remain in contact with the trochoidal inner surface 2.

Each of the open sides of the center housing 3 is closed by a side housing 9. The rotor 5 rotates in the arrow direction. With the rotor 5 in the angular position shown, there are formed a combustion chamber 8 on the downstream side of the minor axis 4, with respect to the rotational direction of the rotor 5, and a cranny space 8a which is a part of the combustion chamber in which unburned gases tend to remain. A spark plug 1 is installed in the center housing 3 at a position downstream from the trochoid minor axis 4 with respect to rotational direction of the rotor.

This spark plug 1 is so installed that its sparking electrodes are disposed within a recess 10 formed within the wall of the center housing and opening into interior of the housing. This recess 10 has an abrupt, semicylindrical wall surface 11 enclosing the side of the spark plug 1 immediately downstream thereof and a tapering groove part with a bottom surface 12 which progressively and smoothly becomes shallower toward the upstream direction.

Figure 2:
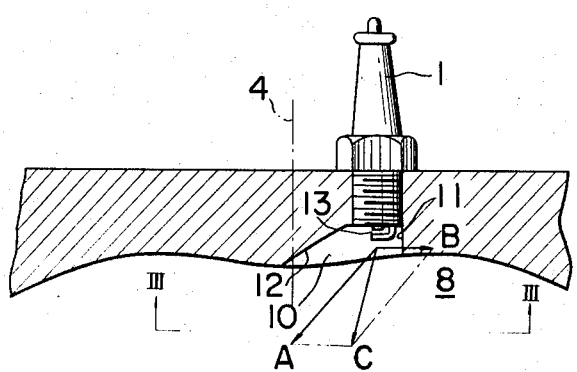
FIG. 2 is a relatively enlarged view showing a part of the cross section in FIG. 1.

The above mentioned wall surface 11 has the function of a reflector for directing a flame generated at the spark gap 13 between the electrodes of the spark plug 1 toward the upstream cranny part 8a of the combustion chamber 8. The bottom surface 12 has the function of directing the reflected pressure wave of the flame from the wall surface 11 smoothly toward the upstream direction. As a result of the combined effect of the wall surface 11 and the bottom surface 12, the propagation direction of the flame can be shown to be as indicated by directional component A in FIG. 2 in the case where there is no flow of working fluid in the combustion chamber 8, but a flow (directional component B) causes some deflection toward the downstream side as indicated by component C.

Figure 3:
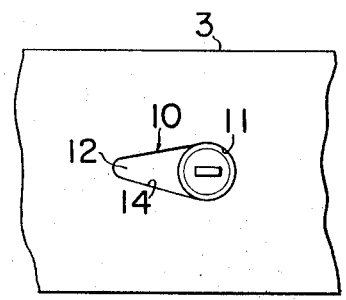
FIG. 3 is a view of the engine center housing as views in the direction indicated by arrows III, III in FIG. 2.

In the example illustrated, the recess 10 extends upstream to a point somewhat beyond the minor axis of the trochoid and has a shape such that its width decreases in the upstream direction. Therefore, the converging side walls 14 (FIG. 3) of this recess 10 have the effect of imparting directivity to the flame.

As the rotor 5 rotates in the above direction during operation, the combustible mixture aspirated through the intake port 15 moves toward the spark plug 1 as it is compressed and is then ignited by the spark plug. Since the gas mixture within the combustion chamber 8 is rotating at high velocity together with the rotor 5, the flame propagation in the rotor rotational direction, in general, is accomplished abruptly. According to this invention, however, the resulting directional component of the flame is caused by the wall surface 11 and the bottom surface 12 of the recess 10 to assume the upstream direction C. As a result, the combustion in the cranny region 8a of the combustion chamber is promoted, whereby the power output is increased, and the content of harmful ingredients within the exhaust gas is reduced as we have verified through actual tests.

Thus, in accordance with this invention as described above, it is possible to promote and improve the combustion in a rotary engine merely by providing a single spark plug 1 and a recess 10 of simple shape in the center housing of the rotary engine. By the practice of this invention, moreover, the recess 10 is disposed in the vicinity of the minor axis 4 of the trochoid, whereby the difference between the pressures in the process chambers on opposite sides of an apex seal 6 passing by this position is small. Therefore, leakage of combustion gases is prevented, and low-speed stability can be maintained.

We claim:

1. An arrangement in a rotary engine comprising a housing having a trochoidal inner surface with a minor axis; a rotor of multi-lobed shape undergoing planetary rotational movement within the casing for executing intake of a working fluid, compression, explosion, and exhaust; means forming a recess in the inner surface of said housing; a spark plug disposed in said recess, said spark plug being disposed at a position downstream, with respect to the rotational direction of the rotor, from said minor axis, said recess being elongated in the rotational direction and being defined by a downstream wall surface continuously and semi-cylindrically surrounding the downstream side of said spark plug; a pair of opposing side wall surfaces contiguously adjoining the downstream wall surface on respective opposite sides thereof and extending upstream in mutually converging directions; and a bottom surface contiguously adjoining said wall and downstream wall surfaces and extending smoothly upstream with such an inclination that the depth of said recess decreases progressively in the upstream direction to zero, whereby the recess directs a combustion flame generated at the spark plug in a converging manner toward the upstream side of the spark plug, said downstream wall surface acting as a reflector for the flame.

2. The arrangement as claimed in claim 1, in which said recess extends upstream to a point substantially upstream of said minor axis of the trochoidal inner surface.

* * * * *